(12) United States Patent
Cunningham et al.

(10) Patent No.: US 7,818,673 B2
(45) Date of Patent: *Oct. 19, 2010

(54) NETWORK MAP

(75) Inventors: Aaron Cunningham, Redmond, WA (US); Marieke I. Watson, Redmond, WA (US); Patrice L. Miner, Kirkland, WA (US); Alexandru Gavrilescu, Redmond, WA (US); Haiyong Wang, Redmond, WA (US); Dennis Morgan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/548,598

(22) Filed: Aug. 27, 2009

(65) Prior Publication Data
US 2010/0064225 A1 Mar. 11, 2010

Related U.S. Application Data

(63) Continuation of application No. 11/364,470, filed on Feb. 28, 2006, now Pat. No. 7,587,675.

(51) Int. Cl.
*G06F 3/00* (2006.01)
(52) U.S. Cl. ............... 715/734; 715/735; 709/223; 370/254
(58) Field of Classification Search .......... 715/734, 715/735; 709/223; 370/254
See application file for complete search history.

(56) References Cited

U.S. PATENT DOCUMENTS

| | | | | |
|---|---|---|---|---|
| 5,023,864 A * | 6/1991 | Cloonan et al. | ............... | 398/78 |
| 5,768,552 A * | 6/1998 | Jacoby | ............... | 345/441 |
| 6,031,528 A * | 2/2000 | Langfahl, Jr. | ............... | 715/734 |
| 6,154,212 A * | 11/2000 | Eick et al. | ............... | 715/848 |
| 6,347,336 B1 * | 2/2002 | Song et al. | ............... | 709/223 |
| 6,535,227 B1 * | 3/2003 | Fox et al. | ............... | 715/736 |
| 6,646,656 B1 * | 11/2003 | Walker et al. | ............... | 715/734 |
| 6,775,243 B1 * | 8/2004 | Valentine et al. | ............... | 370/255 |
| 6,836,275 B1 * | 12/2004 | Arquie et al. | ............... | 715/734 |
| 6,871,324 B2 * | 3/2005 | Hand et al. | ............... | 715/734 |
| 6,885,642 B1 * | 4/2005 | Jain et al. | ............... | 370/252 |
| 7,315,985 B1 * | 1/2008 | Gauvin et al. | ............... | 715/734 |
| 7,336,616 B2 * | 2/2008 | Holma et al. | ............... | 370/252 |
| 2004/0172466 A1 * | 9/2004 | Douglas et al. | ............... | 709/224 |
| 2005/0235227 A1 * | 10/2005 | Martineau et al. | ............... | 715/855 |

\* cited by examiner

*Primary Examiner*—Dennis Bonshock
(74) *Attorney, Agent, or Firm*—Marshall, Gerstein & Borun LLP

(57) ABSTRACT

The claimed method and system provides a graphical user interface that illustrates network topology information, including connection paths between devices on the local network and an external network such as the Internet. The claimed method and system may use a three column format for presenting the topology that is more intuitive for a user. Also, the claimed method and system may aggregate context and connection information from multiple different protocols to provide the topology display. Further, the claimed method and system may use a device registry to enable customized and extensible representations of the network devices.

12 Claims, 16 Drawing Sheets

NETWORK MAP

RELATED APPLICATIONS

This application claims priority as a continuation under 35 U.S.C. §120 to U.S. patent application Ser. No. 11/364,470 (now U.S. Pat. No. 7,587,675), filed on Feb. 28, 2006, and entitled "Network Map."

BACKGROUND

Networking has become an integral part of computing functionality. Typically, however, most computer users are not interested in the details of networking interconnections until a connectivity problem arises. Troubleshooting network connectivity may be made easier using a graphical user interface that may assist a user in detecting areas of a network that may be malfunctioning.

SUMMARY

The claimed method and system uses a graphical user interface to provide a visual representation of a local network and a connection to the Internet. The representation may provide topology information in the form of a map of the network including connection paths between devices on the local network and an external network such as the Internet. The claimed network map may overlay high-level, network status indicators for devices and/or sections of a basic connection map that may be quickly understood by the user. The network map may aggregate data from several services or protocols to present information such as current overall network connectivity, connected devices, connected profiles, connected interfaces, wireless signal strength and/or the availability of a wireless network. Additionally, the network map may serve as an entry point for connecting, disconnecting and diagnosing network connections.

The network map may provide a user a way to view the devices on a network, understand where issues are on the network, and act on these issues to resolve them.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
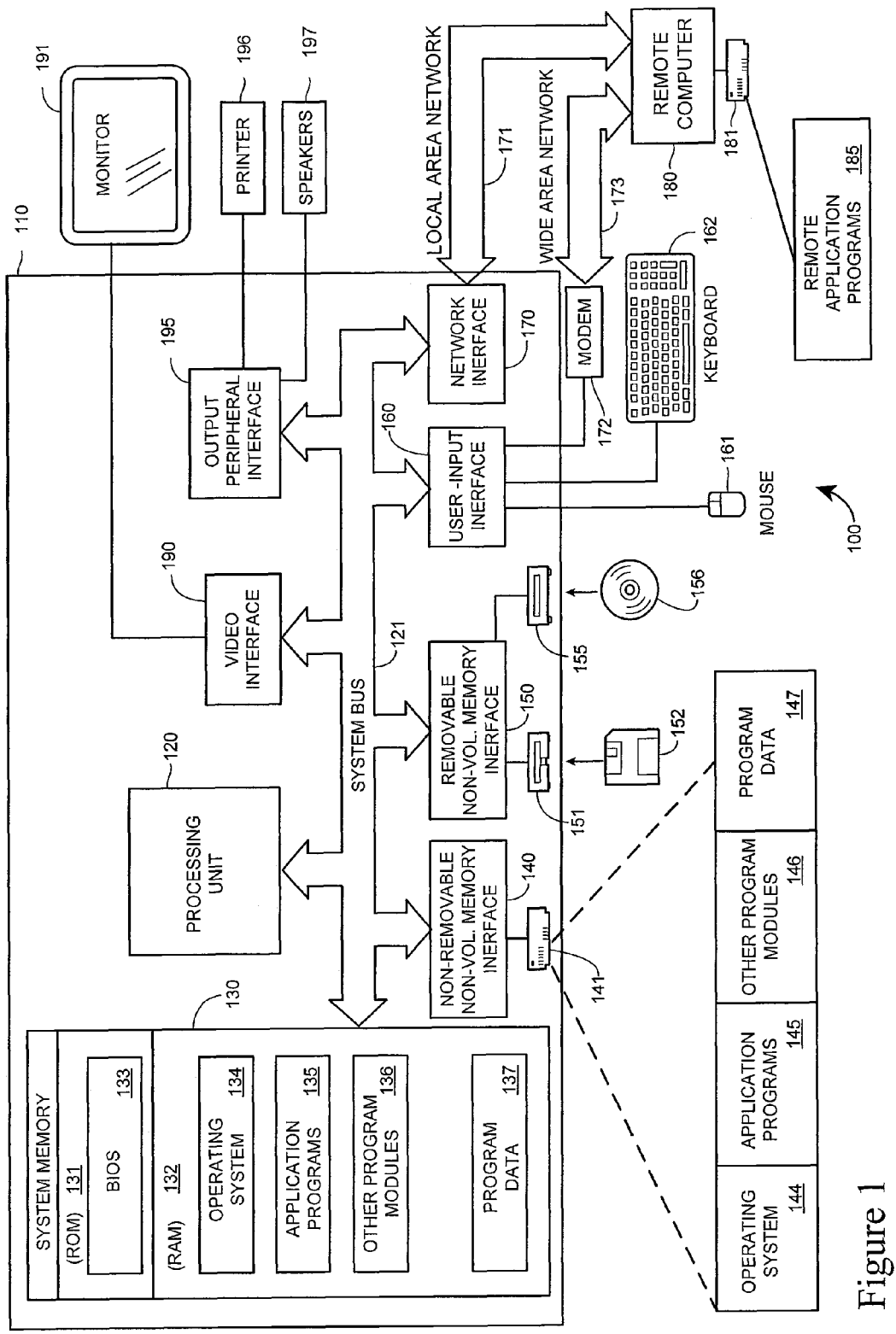
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections illustrated are exemplary and other means of establishing a communications link between the computers may be used.

Figure 2:
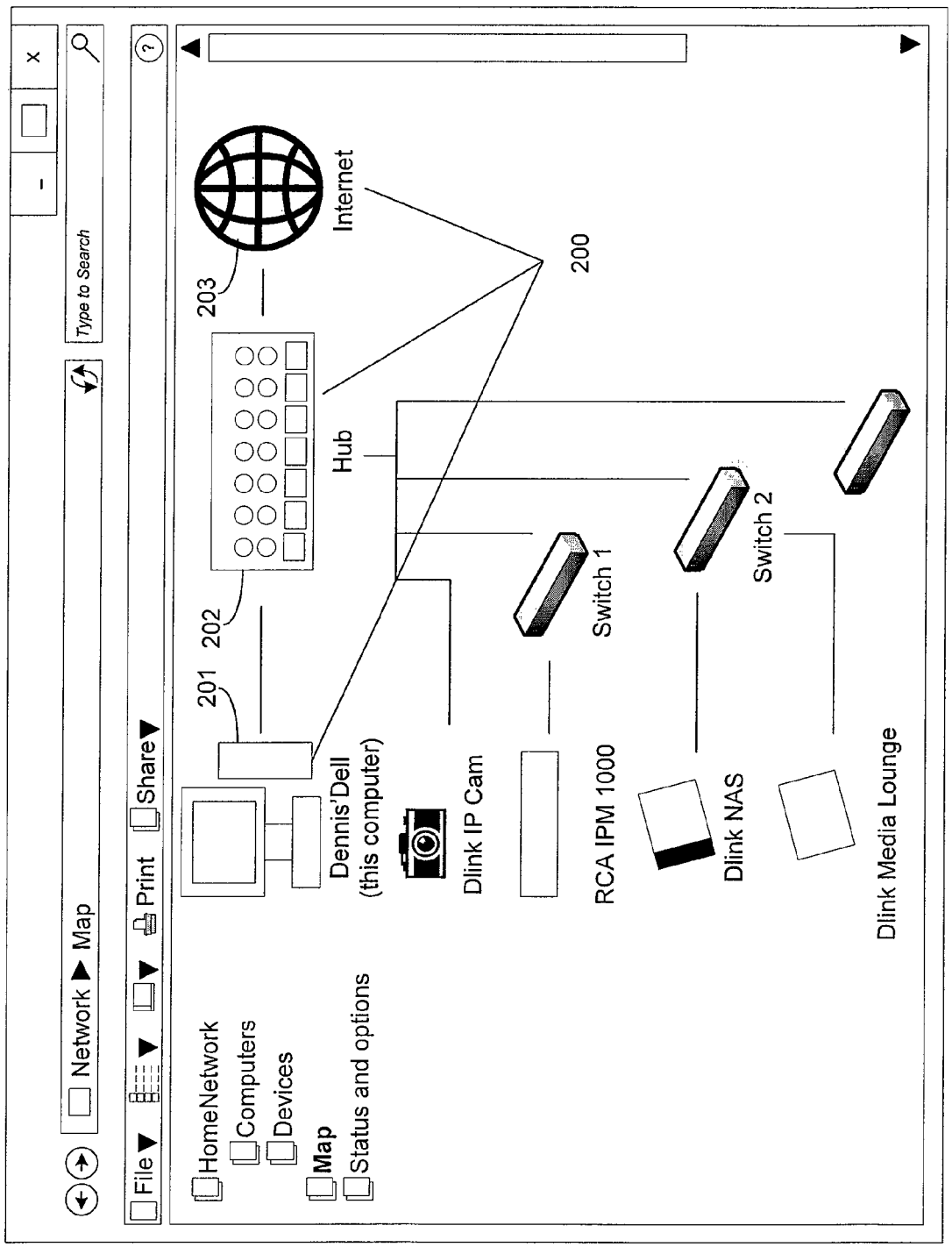
FIG. 2 illustrates a general embodiment of a network map.

FIG. 2 illustrates various elements of a general embodiment of the claimed network map. The network map may include a plurality of network elements 200. Network elements may include terminal devices 201, which are endpoint devices on a network such as computers and hardware devices such as cameras, scanners printers, etc. Network elements may also include intermediate devices 202 or infrastructure devices that connect two or more devices. Intermediate devices include, hubs, routers, switches, gateways, etc. A network element may also be an external network 203, such as the Internet or a larger corporate network.

Figure 3:
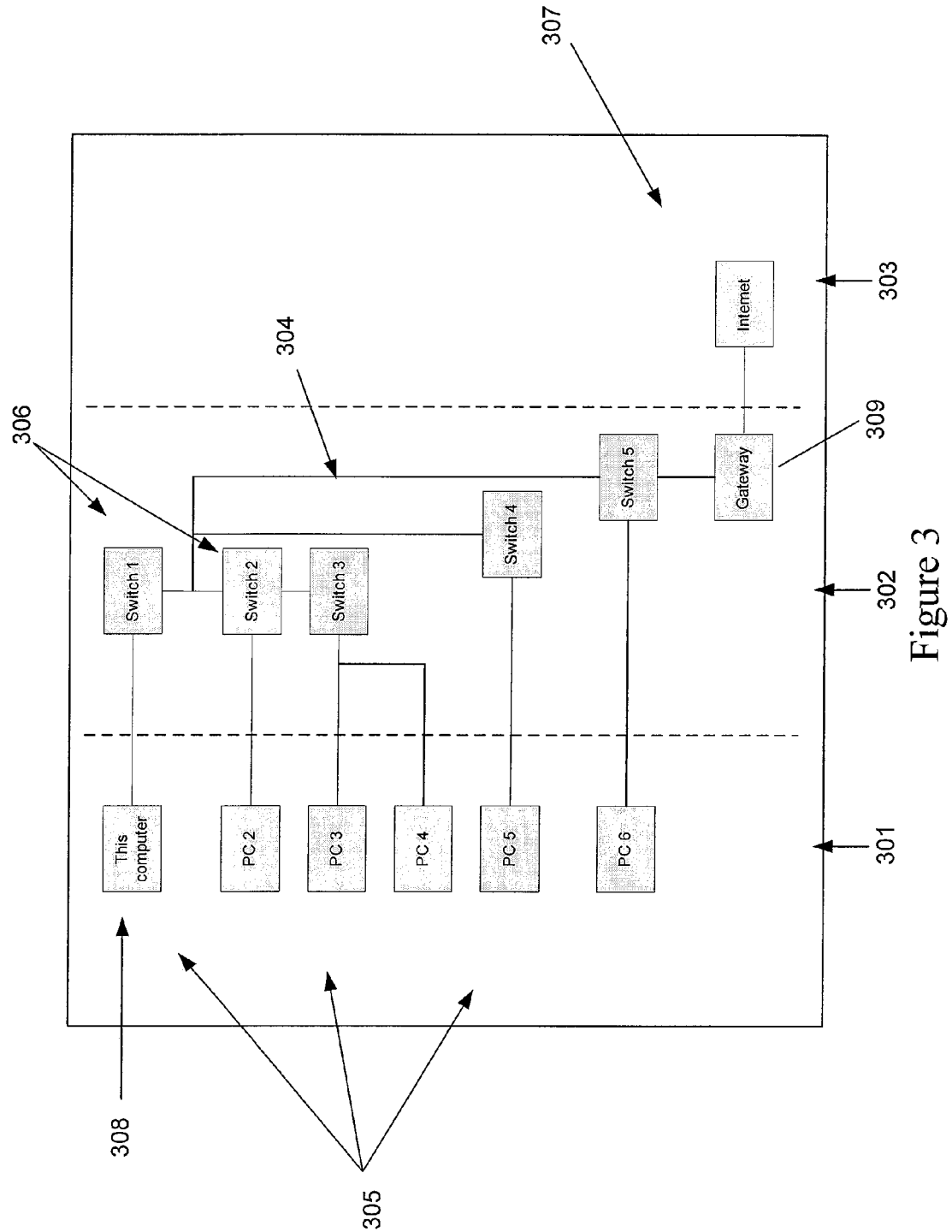
FIG. 3 illustrates a possible column break down of the network map display.
Figure 4:
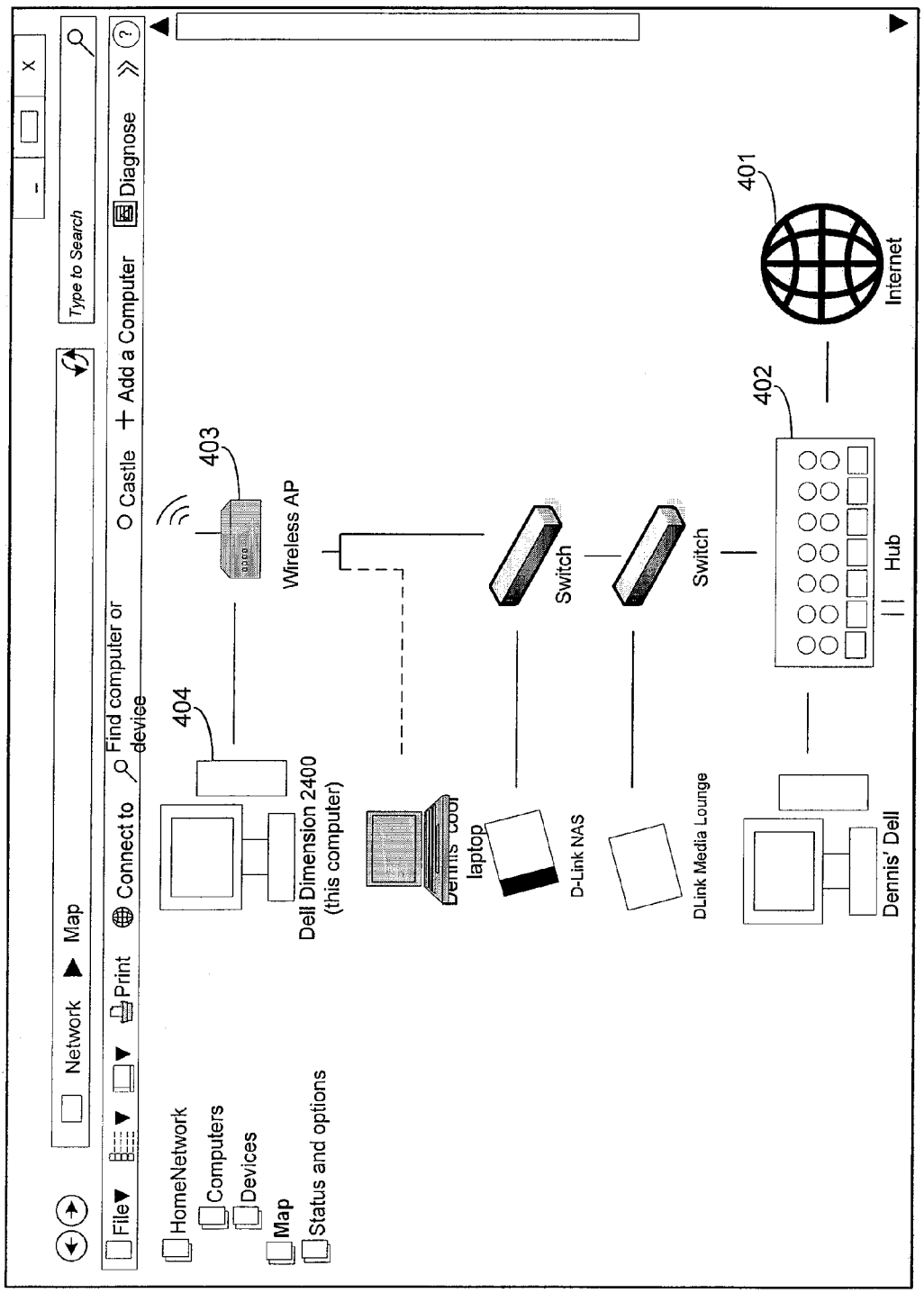
FIG. 4 illustrates a topology in which an Internet connection is formed using a gateway device indirectly connected to a user PC.

FIG. 3 illustrates that the network map may be organized in a three column format including a left 301, middle 302, and right 303 column. Terminal devices 305 may be disposed in the left column 301, intermediate devices 306 may be disposed in the middle column 302, and external networks 307 may be disposed in the right column 303. Connection lines 304 may join any two devices. In one embodiment, the primary focus of the network map may be the user PC 308. Thus, the user PC 308 may always be located at the topmost position of the left column 301. All other connected devices may be disposed below and to the right of the user PC 308. The primary focus of the right column 303 may be an external network 307 such as the Internet, while the middle column provides information on an interconnection between the user PC 308 and the Internet 307 using, for example, an internet gateway device (IGD) 309. FIG. 4 illustrates that the Internet 401 may be connected to a device 402 other than the intermediate device 403 the user PC 404 is connected to.

Figure 5:
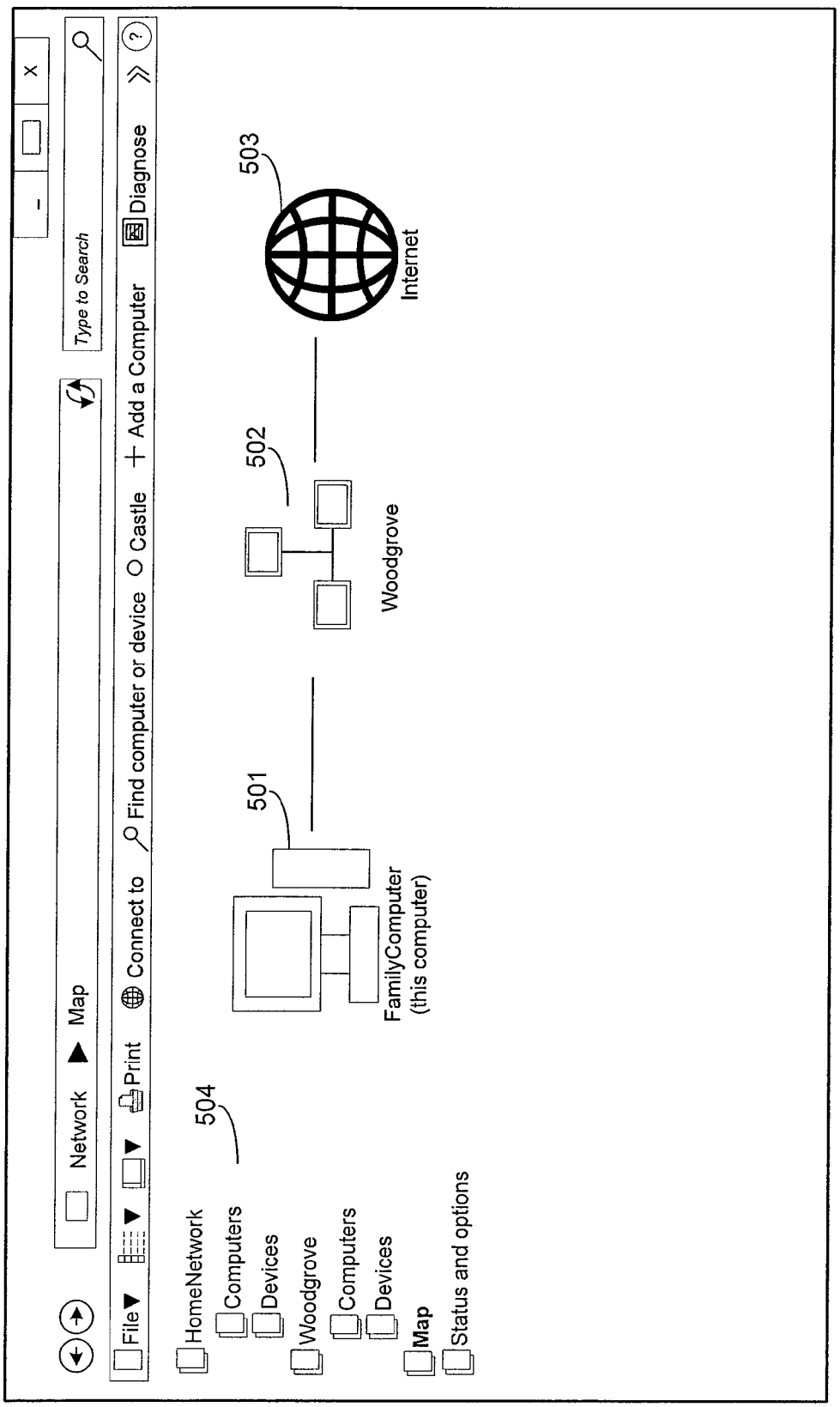
FIG. 5 illustrates a mini-map embodiment of the network map.

The network map may be displayed in a compressed mini-map mode as illustrated in FIG. 5 or an expanded full map mode as illustrated in FIGS. 2 and 4. An option to expand or collapse the map between the two modes may also be provided. As illustrated in FIG. 5, the mini-map may be a compressed map in which the left column may display only the user PC 501, the middle column may be an interconnection representation 502, and the right column may display the Internet 503. The layout may be used to provide a high-level representation of a user's primary connection concern, i.e., the user computer connection to a local network and/or to the Internet. In one embodiment, the mini-map view may be the default view when opening network map, where a user diagnostic process begins. The mini-map may also be the default map view when the user is connected to a work location where the corporate local net is large and a user's primary concern may be that the user computer is simply connected to the corporate net (represented in the middle column 502) or that the corporate net provides working connectivity to the Internet.

Figure 6:
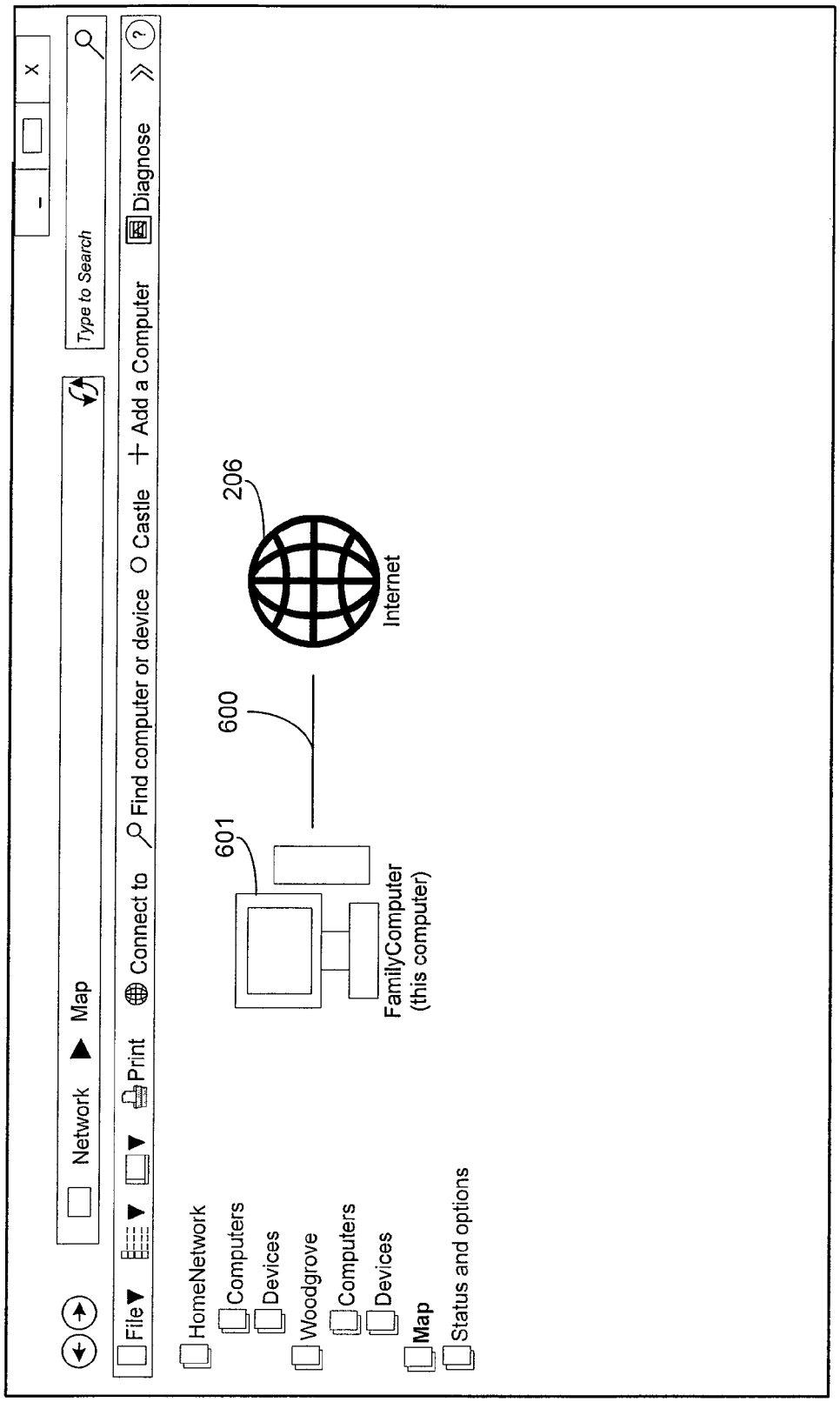
FIG. 6 illustrates a network map that is directly connected to the Internet.
Figure 7:
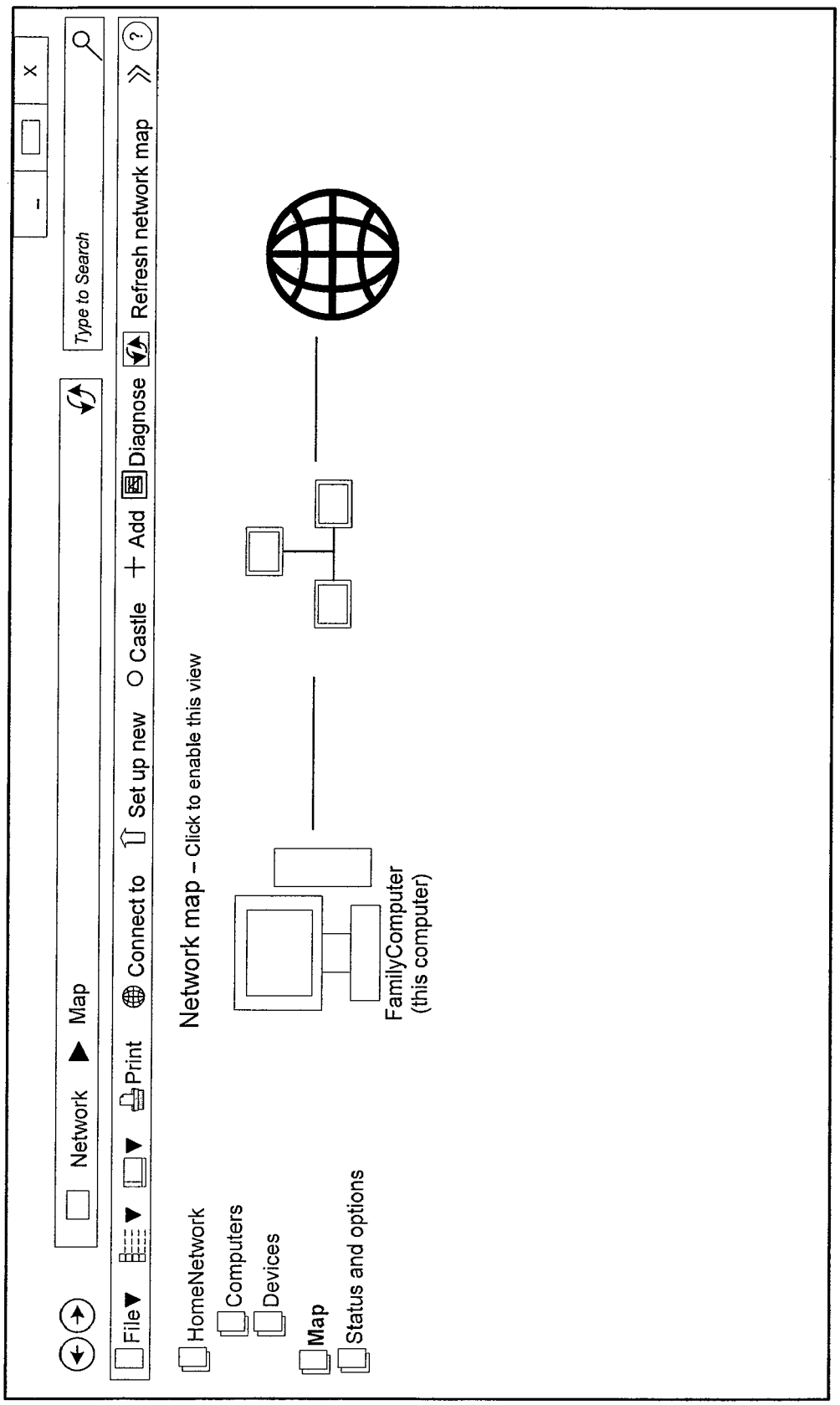
FIG. 7 illustrates a network map for a network that was previously detectable, but not currently detectable.
Figure 8:
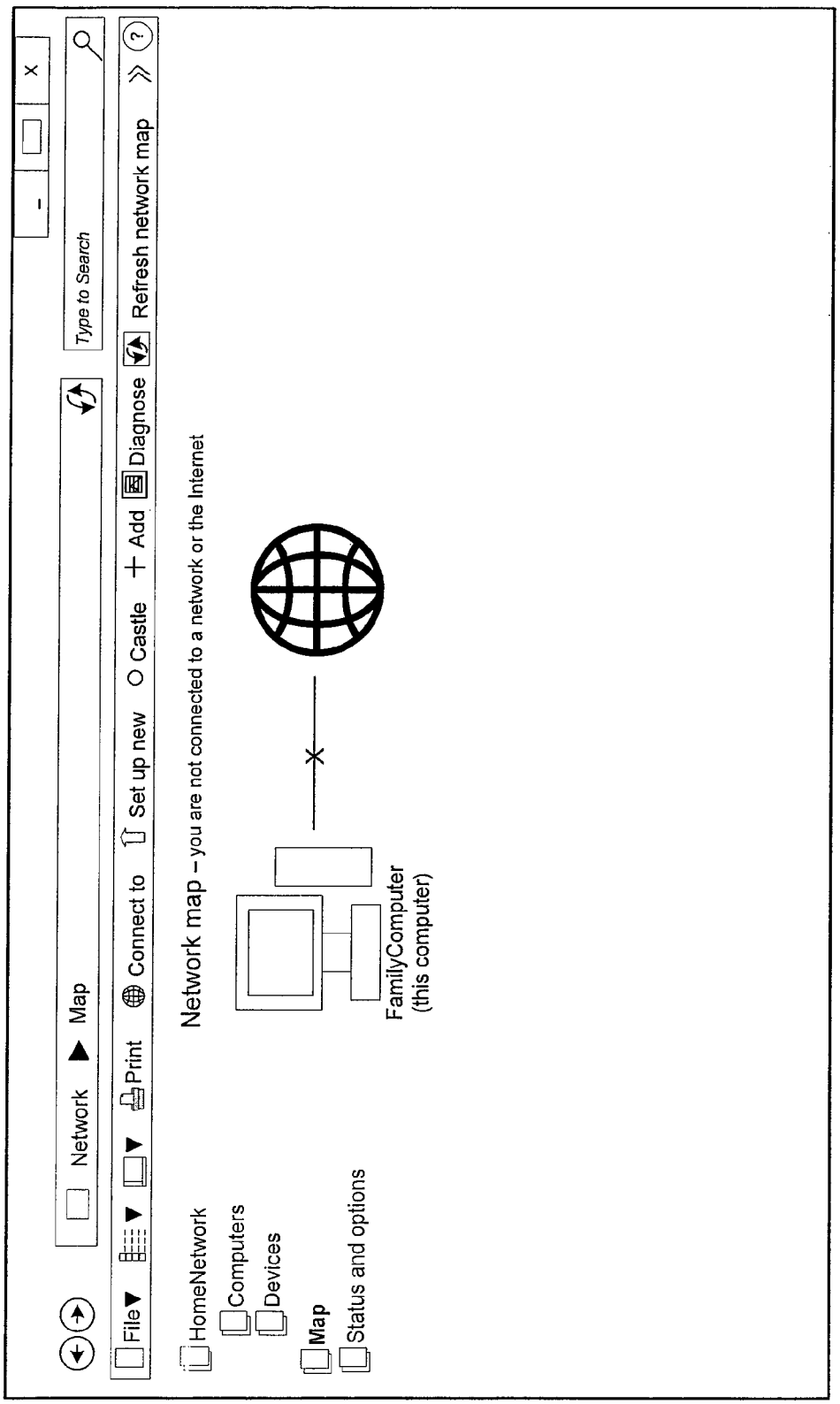
FIG. 8 illustrates a network map where no current connection may be detectable and no previous connection may have been detected.

The mini-map may be used to initially indicate whether there is a connection to the local network, (e.g., via colored or grayed icons) and then whether there is a connection to the Internet. The default gateway from a user PC to the Internet may be represented in the middle column 502 of the mini-map. FIG. 5 illustrates connectivity to the local network and to the Internet with bright icons (which may be colored as well). If a connection to a network is not detectable using the discovery protocols (e.g., not Ethernet), the map may display a direct connection 600 from the user PC 601 to the Internet 602, as illustrated in FIG. 6. FIGS. 7 and 8 illustrate a situation where the user PC may be disconnected from a network or where a network is undetectable using a network discovery process. FIG. 6 may illustrate a case where a profile has been generated for a network previously discovered but is not currently detectable. FIG. 7 may illustrate a case where there is no currently detectable connection and no previous network connection had been established. If the user should disconnect from the network for which the map may be initially shown, the network map may switch to a new preferred profile. If there are no longer any active profiles the user may be shown a map with a no connectivity representation as seen in FIG. 8.

Figure 9:
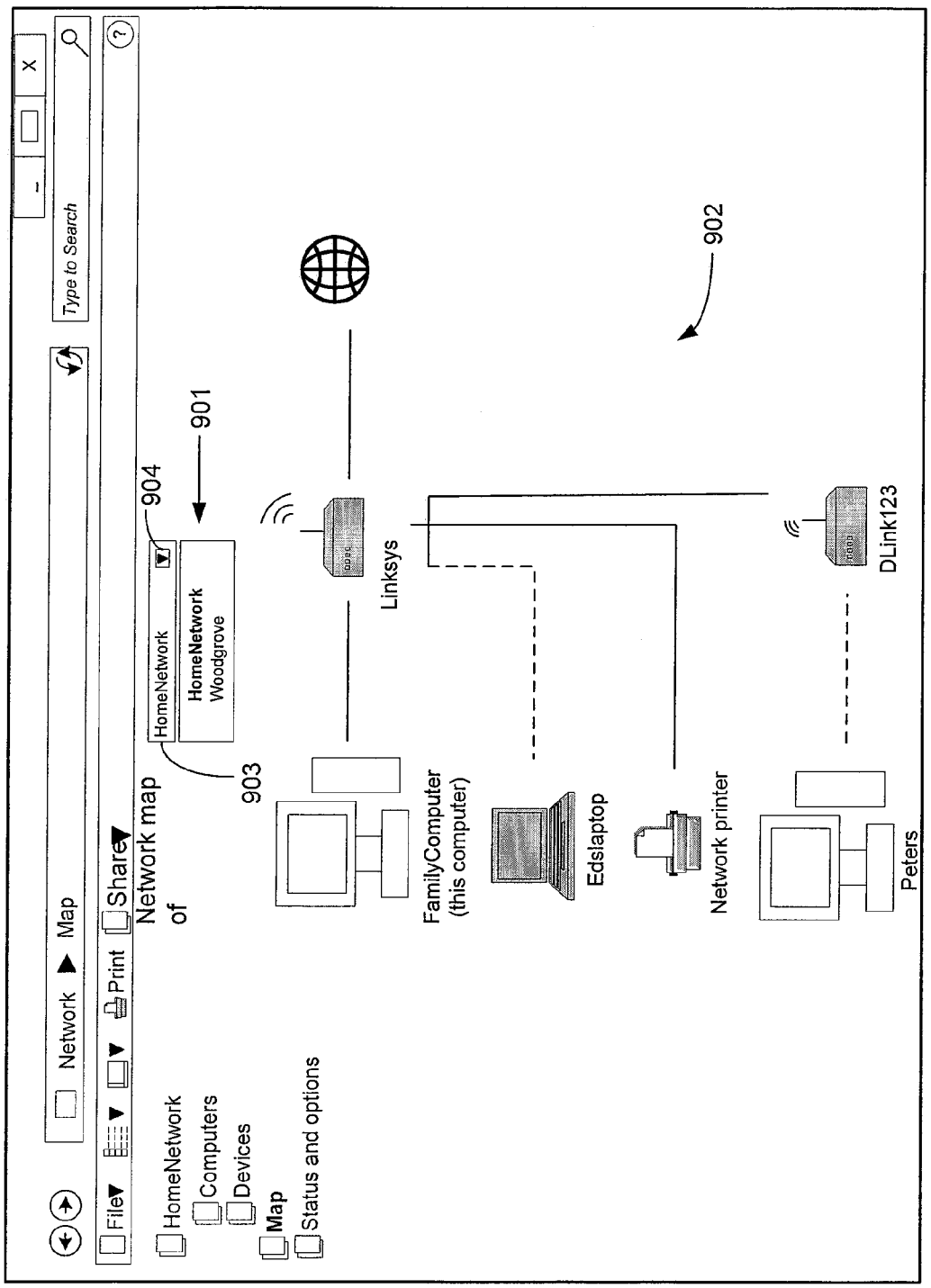
FIG. 9 illustrates a network map having a listing of accessible network profiles selectable via a drop down menu.

The expansion of the network map view from the mini-map to the full map may assist the user in pinpointing a malfunction by going from a high level view to a more detailed view of a network. Thus, if the mini-map view does not provide a detail level required to diagnose a problem, then a user may choose to expand the map. In the expanded map, all devices for a network profile may be displayed along with connection lines representing interconnections between the displayed devices. The expanded view, as illustrated in FIG. 9, may provide a listing of accessible network profiles 901 along with a map of the devices 902 for a profile 903. The user may thus navigate between multiple network profiles 901 using a menu 904. As one of many embodiments, the menu may be a drop down list 904 as illustrated in FIG. 9, or a tree menu 504 as illustrated in the mini-map of FIG. 5.

Figure 10:
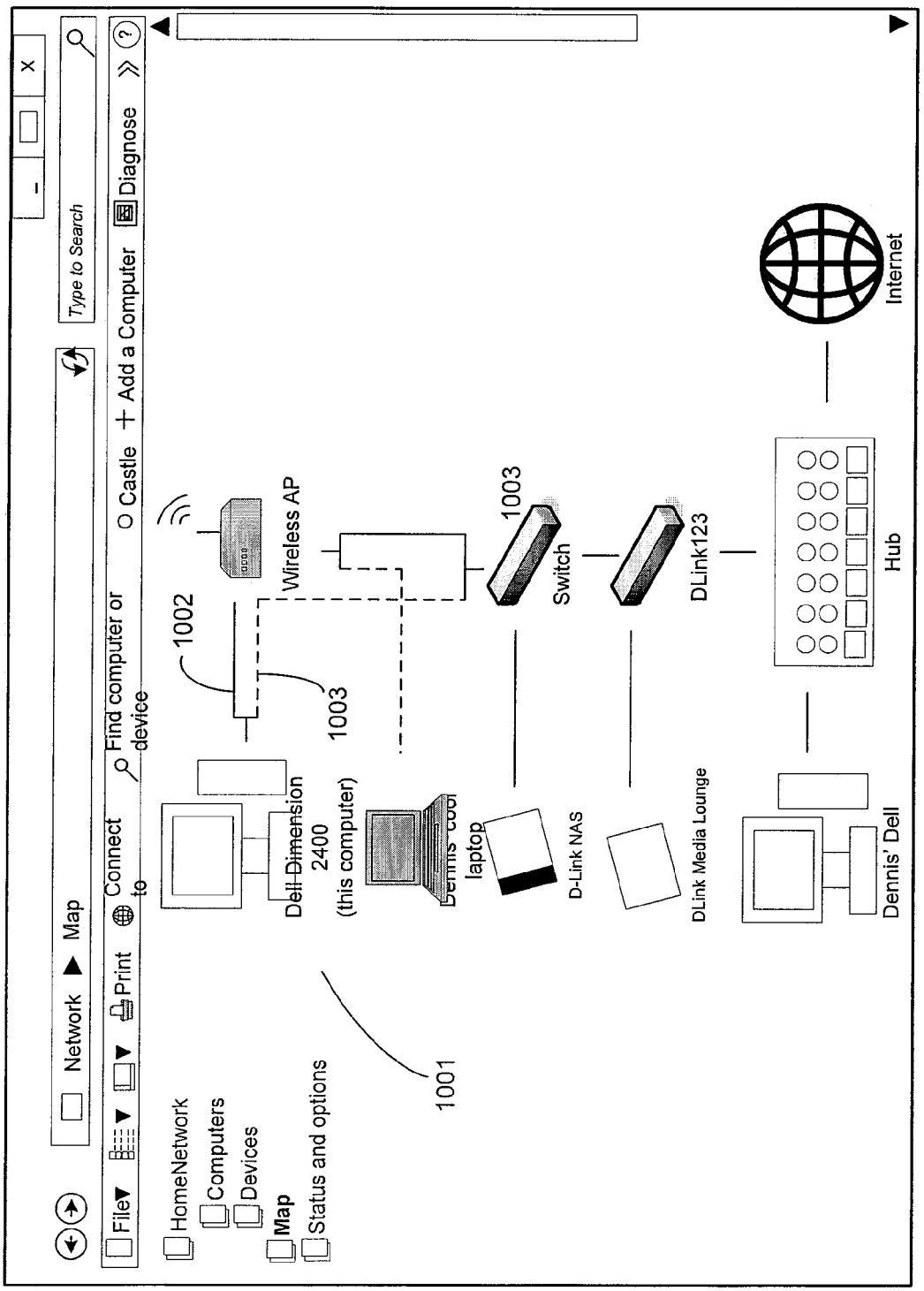
FIG. 10 illustrates a user PC having multiple different connections to the same network.
Figure 11:
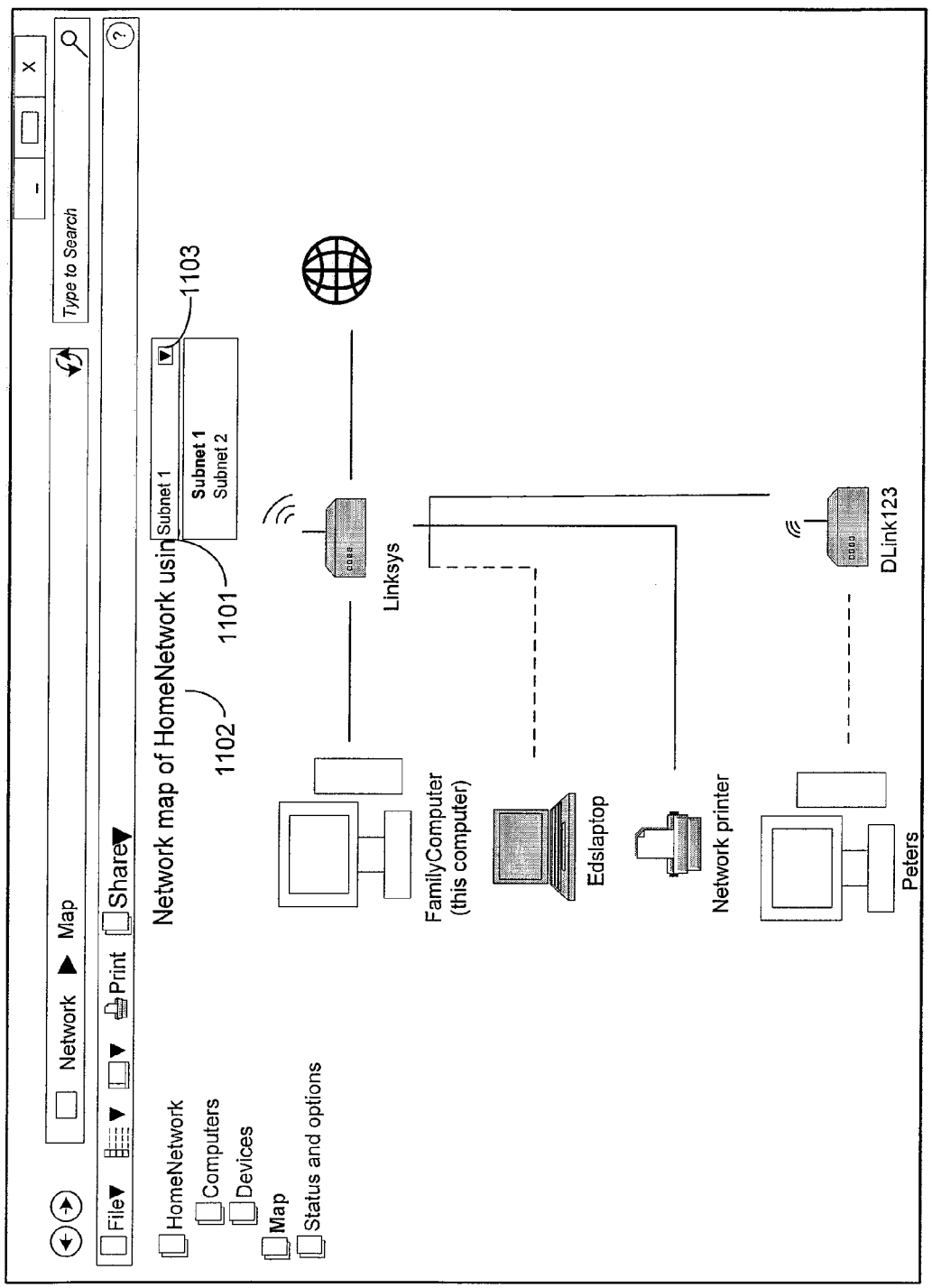
FIG. 11 illustrates a user PC having multiple different connections to different networks.

In one embodiment, there may be only one network map per network profile. If the PC is connected to multiple networks at the same time, the map may display a preferred network profile. FIG. 10 may illustrates a computer 1001 having multiple connections to the same network profile. The network map may have multiple connection lines 1002, 1003 to illustrate the multiple connections. Although it may be rare, a user PC may have multiple NICs connected to different subnets, while both NICs may be in the same profile. FIG. 11 may illustrate one such example. In this case the single profile name may have the interface name 1101 appended to the profile name 1102 and the user may be able to switch between them using a menu 1103.

In one embodiment, the network map may be linked or associated with a network explorer (not shown), or network browser system, where the network explorer initially only provides a listing of discovered network devices with context information but without any topology information. In one embodiment, network map may be included as an additional a view within a browser such as network explorer. Such a browser system may function primarily to provide a user a listing of possible network resources for consumption and access. When the user desires to interact with a device that requires connection information or to diagnose a device, the user may then link from the network explorer to the network browser. In one embodiment, the network explorer and network browser may be designed to provide consistent general display icons and menus, where the icons and menus may correspond to the same view items. For example, the same network profile selected when displaying computers and devices from network explorer may be presented when opening network map from the network explorer. While no computers or devices may appear in the network explorer that does not appear in the network map, the map may show devices that the explorer does not, such as intermediate connection devices. This consistency may help a user quickly identify and associate devices and infrastructure elements when navigating between the explorer and map.

Diagnostics

Figure 12:
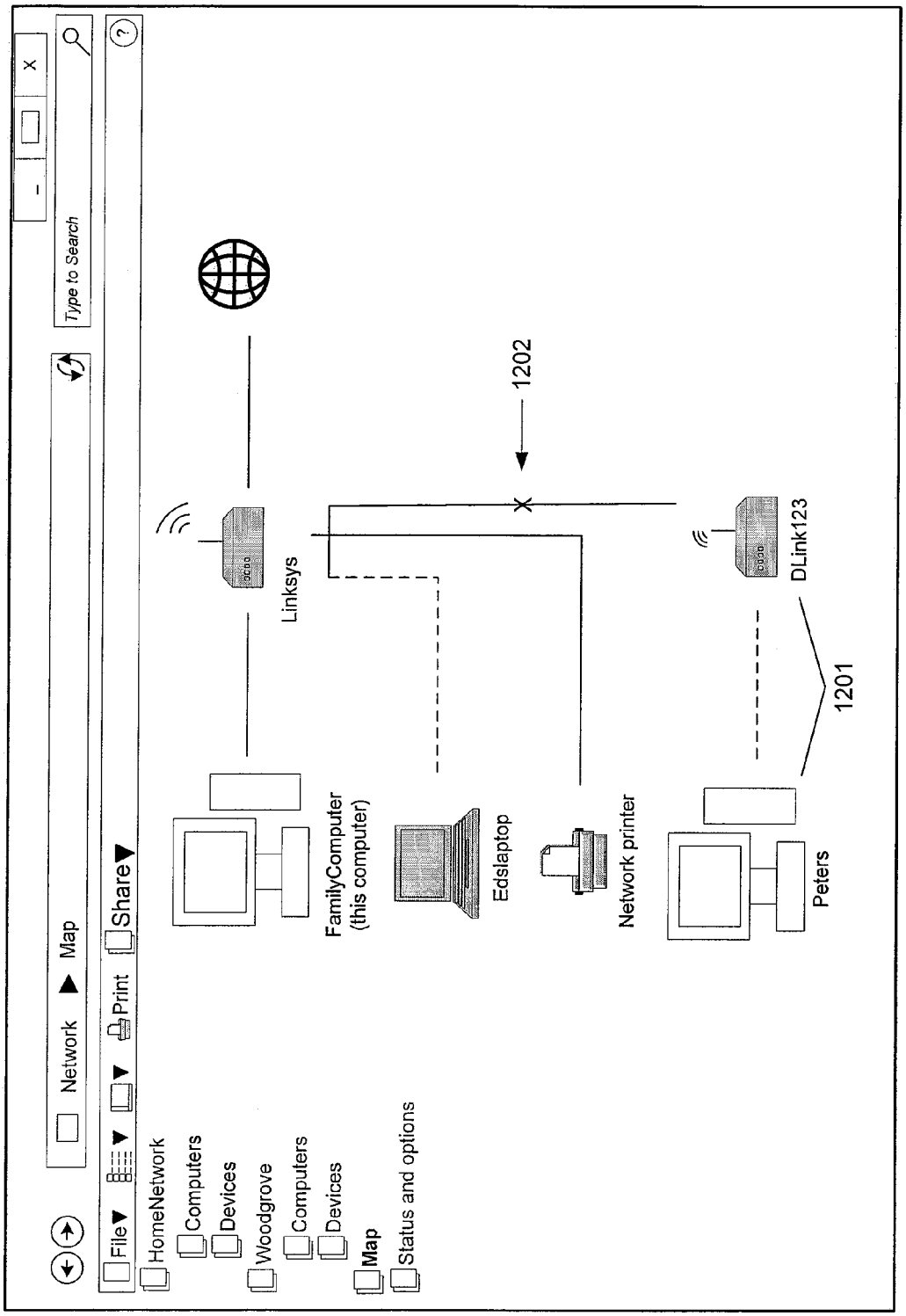
FIG. 12 illustrates a network map with disconnection indications.

The network map may be used to first isolate a general area of a network that may be malfunctioning and then provide a user an option to invoke a network diagnostic tool from the network map. In one embodiment, the network diagnostic tool may provide information on the particular device(s)/connection(s) that may be malfunctioning, thereby allowing the network diagnostic tool to begin on the problem area. As illustrated in FIG. 12, general connection problems may be exposed using indications of connectivity problems such as grayed out devices 1201 and connection line disconnects 1202. Diagnostic information may be overlaid on the basic topology network map using a number of different screen elements. For example, segmentation indicators, changing icons, tool tips, context menus, etc. may be provided, as discussed below.

Display Details

As discussed above, the user PC or local PC may be consistently located in the top left of the network map. In this manner, the PC may be made the focus of origin for all other connections in the map. The local PC may have a friendly description associated with it, otherwise a default hostname may be provided instead. An additional string may be appended at the end of the friendly description to indicate that the icon is the user computer (e.g., "This Computer," or "My Computer"). A vendor provided icon may be provided if a registry entry so indicates. In one embodiment, the representation of the user PC may be highlighted, e.g., using a halo (not shown), to make it visually distinct from any other icon on the screen. As discussed above, the PC representation may indicate a connectivity state of the device using a colored icon, which may represent connectivity, and a grayed out icon, may represent no connectivity. Alternatively, the icon itself may change form to indicate connectivity state. Also, a degree of color or shading may be used to indicate strength of a connection, e.g., in a wireless signal strength (not shown).

Figure 13:
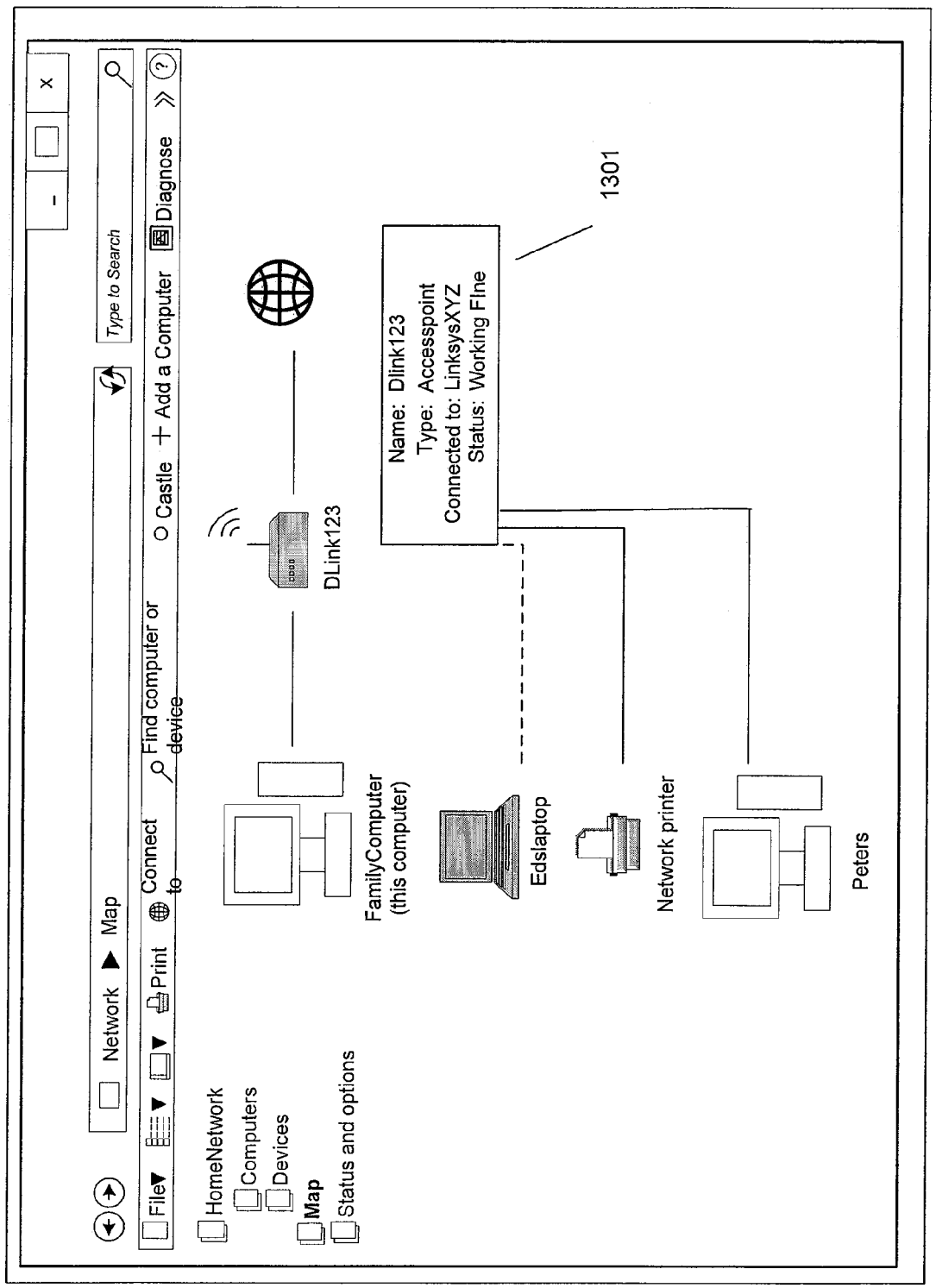
FIG. 13 illustrates a tool tip.

A tool tip may be provided over the icon of a displayed device when a pointer is placed over the icon. In one embodiment, as shown in FIG. 13, the tool tip 1301 may provide any of the following information:

Device Name: fully qualified domain name (FQDN)
Device Address: IP addresses (e.g., IPv4 address, IPv6 global address)
Default Gateway: address of default gateway (both IPv4 and IPv6)
DNS Servers: address of DNS Servers (both IPv4 and IPv6); service set ID (SSID) of wireless network to which it is connected (if applicable)
Authentication Type: wireless authorization method (e.g., Wired Equivalent Privacy, or "WEQ", if applicable)
Connected To: name of the infrastructure device connected
Status Indicator:
   Healthy—the PC has a valid IP address and may send packets past the default gateway;
   Misconfigured—the PC may have a bad IP configuration; and/or
   Disconnected—the PC may be in media disconnect.

Terminal devices other than the local PC may be disposed in the left column. These terminal devices may include other PCs, printers, gaming devices, and/or any device having a valid IP address. Each terminal device may similarly have a friendly description, or hostname if a friendly description is not available, and a vendor provided icon (if available). PCs and devices connected to the same infrastructure piece may be ordered by name, except for the local PC, which may always be in the top left corner. Each representation may indicate a connectivity state, similar to that described for the local PC.

A tool tip for a terminal device may include any of the following:

Device Name: hostname of device
Device Manufacturer: name of device manufacturer
Device Address: IP address(es) including IPv4 address, IPv6 global address, etc.
SSID (service set identifier): SSID using to connect to the wireless network (if applicable)
Authentication Type: Wireless authentication method (if applicable)
Contact Info Infrastructure devices or intermediate connection devices such as hubs, routers, switches, etc. may be disposed in a middle column of the network map display. Each item may be represented by an icon and a friendly name. The icon may be provided by a user through a registry. If a vendor provided name is not available, a generic label may be used for the device. If there are multiple infrastructure devices of the same type, then a numeric suffix may be added to make the name unique. For example, "Hub," "Switch," "Bridge," "Access point," etc. Each representation of an intermediate connection device may indicate a connectivity state, similar to that described for the local PC.

A tool tip for an intermediate device may include any of the following:

Device Name: hostname of device
Device Manufacturer: name of device manufacturer (if available via LLTD)
Device Address: IP address(es) including IPv4 address, IPv6 global address, etc.
   If the infrastructure piece is an IGD, this should be:
      Public Address: WAN IP
      Private Address: LAN IP
BSSID (basic service set ID): BSSID (if applicable)
SSD: SSIDs being broadcast (if applicable)
Channel: wireless channel number (if applicable)
Authentication Type: wireless auth (if applicable)
Type: type of device (hub, switch, etc.)
Connected to: name of the infrastructure device(s) connected
Status: Healthy—the device was discovered in the current mapping session;
   Disconnected—the device is in the "last known good" cache but was not found in the current mapping session An external network may be represented in the right column of the display. This external network may be a network having interconnections that are not of primary concern to the user, but whose connection to the local network may be important in providing functionality to the user. The external network may be the Internet. A connectivity state of the external network may be displayed using, for example, colored or grayed icons.

Connection lines may show interconnections between devices. The connection lines may indicate connection type, such as wired, wireless, dial-up, etc., using different line representations, e.g., single line, double lines, dotted lines, colored lines. The connectivity state may also be represented (e.g., color or grayed line). Links may traverse any of the display columns. A tool tip may be used instead of or in addition to the icon to show connection type. The tool tip may also provide other information about the network.

In one embodiment, connection lines may be built in the following manner between two nodes, where a child node may refer to a first node of the two nodes further connected from the user PC than a second node of the two nodes. If the child node is a terminal device node and the child node is the first terminal device child, a straight horizontal line may be created between the two nodes. If the child node is a terminal device and not the first terminal device child, a three segment line may be created. If the child node is a non-terminal device node and the child node is the first non-terminal device child, a straight vertical line may be created. If the child node is a non-terminal device node and the child node is not the first non-terminal device child, a three segment line is created.

There will be times when network map may be unable to determine how devices may be connected to a network. In this situation an infrastructure device may be created and labeled as unknown. Network map may create the unknown nodes to represent the following cases:

1. The local PC may have a default gateway, but the gateway connection may be unknown. A gateway node may be created and inserted under the unknown node.

Figure 14:
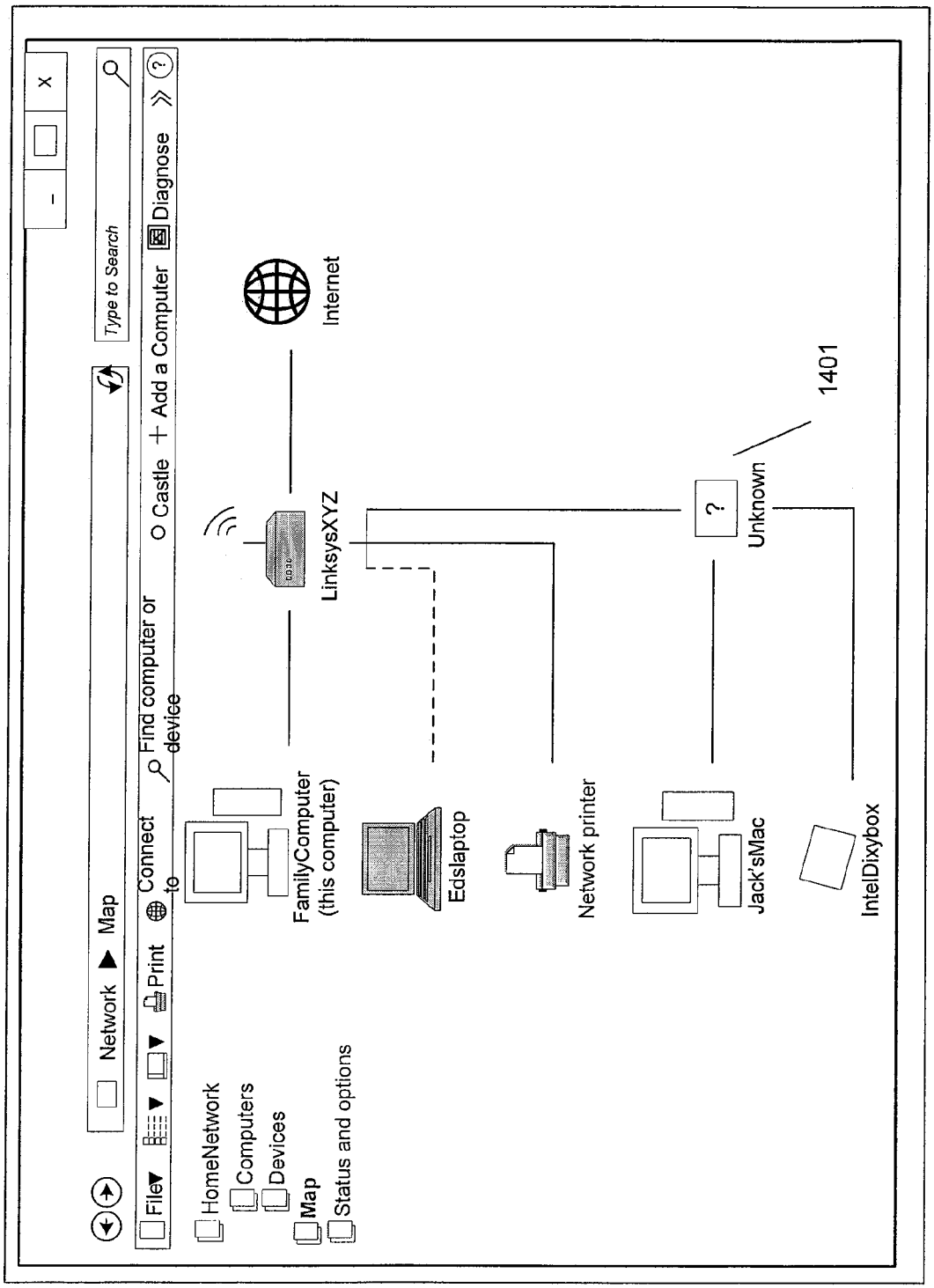
FIG. 14 illustrates an unknown icon.

2. Discovered devices may not have connection information. FIG. 14 illustrates that an unknown node 1401 may be displayed in the appropriate column.

Building The Map

Each network map displayed to the user may be derived from two separate maps, a cached map, or last known good map, and a current map. The union of devices and connections of the cached map and current map may be displayed to the user. The cached map may be initially provided upon first invocation of the network map, where there is no previous last known good map cached. The union of the two maps may then replace the cached map. The current map may be produced from a current, continuous discovery process providing new or updated information to the network map.

The cached map enables the map to provide indications of differences between the connections and devices, more specifically, of connectivity changes. For example, where the cached map shows a device being connected at a previous time and where that device is not returned in a recent discovery process, then that device may be indicated as disconnected. Similarly, if the device is in the current discovery result and not in the cache, the device may be a newly added device. FIG. 8 may illustrate the situation where a user PC may have no connection to a network and no previous network profile defined (hence no previous connection information). FIG. 7 may illustrate a case in which there may have been a previously connected topology including a local network and an Internet connection. However, currently there is no connection to the Internet or local network, as indicated by the grayed out icons.

Network Item Factory may manage discovery protocols that periodically poll for new devices on a network. When a new device is found, the network map may be updated or redrawn with the new information. For discovery protocols that only respond to queries, updates may be provided only upon a user initiated refresh of the map. In such a case, a last known good version of the map may be deleted and replaced with a current map resulting from the user initiated discovery process and effectively, the last known good map may be displayed to the user.

Interaction Options

The claimed network map may provide a set of interaction options to a user. Because the user PC may be the primary focus of the map according to one embodiment, an option for presenting the main shares accessible by the user PC may be provided. This may also provide a test for the scope of accessibility for the user PC. In a Microsoft Windows environment, for example, this option may be provided by activating a "My Computer" folder. In one embodiment, the network map may provide an option to export the map image or a section of the map image.

Terminal device options may be provided to the user via a context menu. The options may be consistent with the options provided via a network explorer. Access control lists for these options may be determined by the device. If the terminal device is a composite multifunctional device having multiple independent functions, the union of the options for each individual function may be provided in one context menu for the device (e.g., scan and print actions). A diagnostic option may provide an indication of the accessibility of the device.

Figure 15:
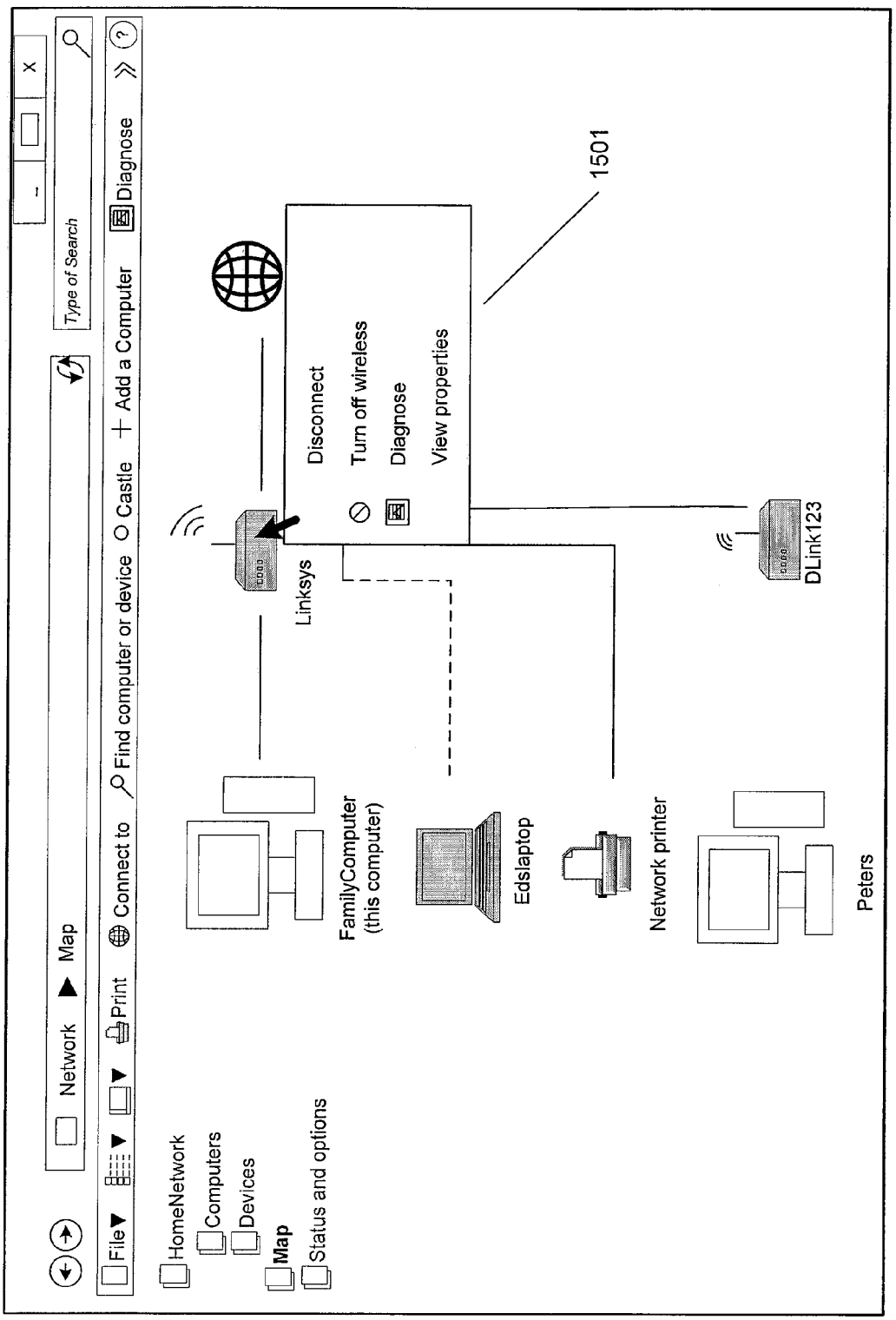
FIG. 15 illustrates a context menu.

FIG. 15 may illustrate that intermediate device options may be provided to the user via a context menu 1501. Similar to terminal devices, the options may be consistent with the options provided via a network explorer and may be restricted by access control lists. Also, multifunctional devices may have the union of its function options provided in one context menu. If the device has an IP address, then this IP address may be used to test the connectivity of the device. If the devices is a wireless access point, a diagnostic function may determine whether the local PC can authenticate with it and access its connections. If so, these options may be presented. Otherwise no diagnostics options may be available.

The external network may provide options specific to the type of external network represented. For example, if the external network is a corporate network, then a default browser may be open for an internal site or share. If the external network is the Internet, a default web browser to the Internet may be opened. A diagnostic option for the external network may provide an indication of the accessibility of the external network. For example, a particular site of the external network may be opened to further process diagnostics.

Connection lines may provide options for diagnosing connection problems. For example, the connection line may indicate whether the line is completely dead or whether there is some signal detectable on the line.

Network Map Components

Figure 16:
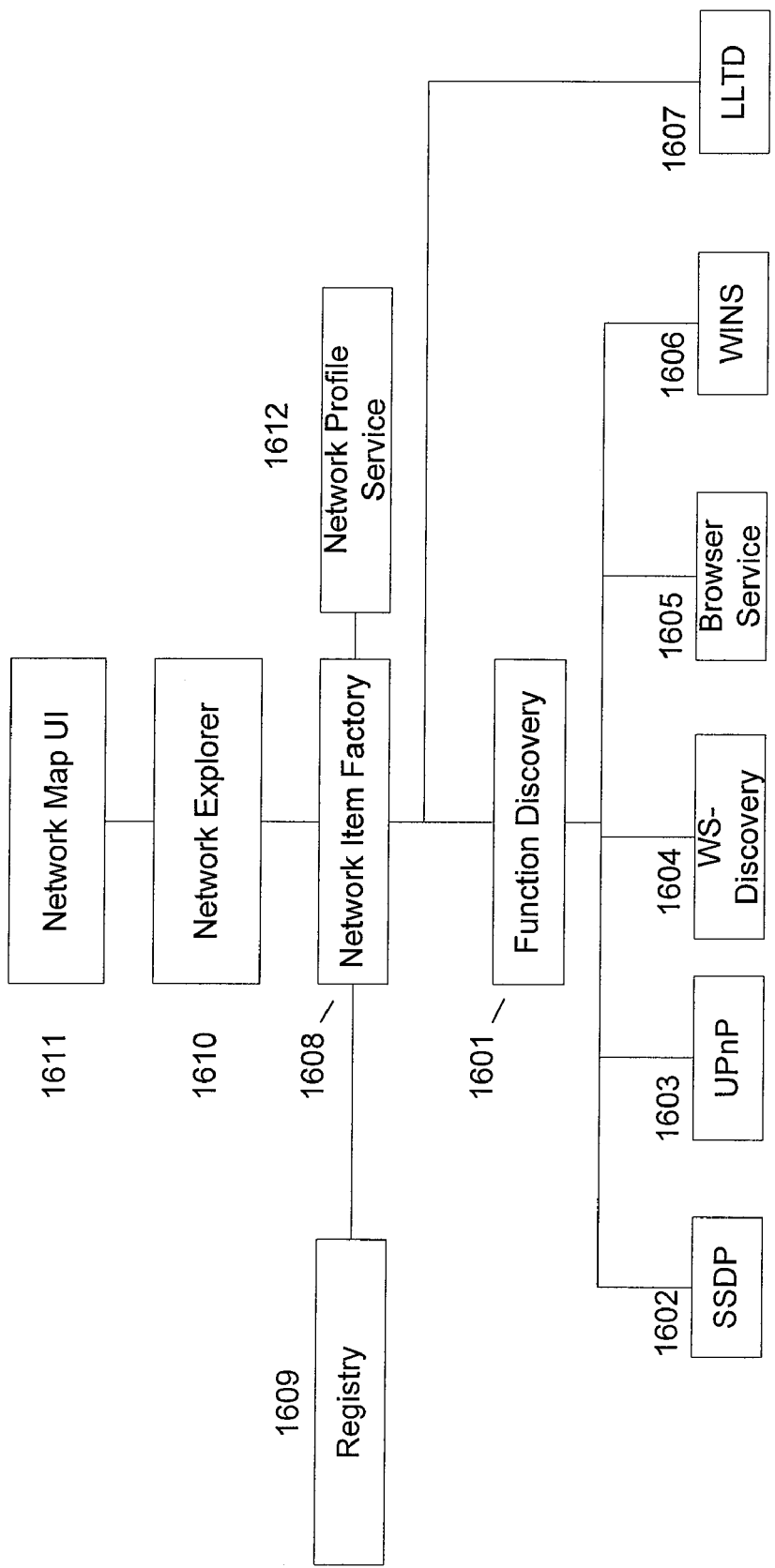
FIG. 16 illustrates a component diagram of a network map embodiment.

The functionality of network map may be provided using the components and architecture illustrated in FIG. 16.

Function Discovery (FD) 1601 may be a common API that performs device discovery across multiple protocols 1602-1606 and that provides a list of discovered devices and context information on the devices. Function Discovery 1601 may provide a listing of function instances. Each function instance may include a set of identifiers for a device discovered on a network.

Link Layer Topology Discovery (LLTD) 1607 may be an API used to provide connection and association information for devices discovered on a network. LLTD 1607 may provide a result set in the form of a rudimentary topology of devices and interconnections. Because LLTD 1607 may primarily focus on device detection and association rather than device property identification, the rudimentary map of LLTD 1607 may need to be augmented or transformed to provide a workable map. For example, LLTD 1607 may provide a listing of discovered devices, some of which are unidentified, e.g., they have no MAC addresses.

Network Item Factory 1608 is responsible for creating a network item object based on a context information received from FD 1601 component and LLTD 1607. Network Item Factory 1608 maintains a collection of network items representing network devices on a given network. Network Item Factory 1608 may take connection information from LLTD 1607 and context information from FD 1601 to create a network item. A network item object may thus include device specific information and connection information. Network Item Factory 1608 may also use a Device Extensibility Registry 1609 to provide additional device specific information for the identified devices via a registry entry or via a reference to a device plugin (e.g., a COM component) that may be able to provide device specific information.

Network Explorer (NE) 1610 may be an object responsible for overall coordination of underlying components in the architecture to provide a view that may be rendered using a Map UI 1611 (MUI). The NE 1610 may communicate with a Network Profile Service 1611 (via NE) to get a list of connected networks. The Network Profile Service 1611 may provide a list of connected networks and may enumerate a list of interfaces currently connected to a given network. NE 1610 may be responsible for creating a Map UI 1611 for presenting the list of network profiles to a user thereby allowing a user to select a network profile corresponding to a connected network. NE 1610 may then pass a network item collection for a selected network profile to the MUI 1611.

The Map UI (MUI) 1611 may present a display of the physical network topology using a customized layout, as discussed previously. Upon creation of a shell screen, the MUI 1611 may communicate with the Network Item Factory 1608, which may initiate an asynchronous query for association and connection information from LLTD 1607 and context information from FD 1601. As discussed, the Network Item Factory 1608 may then create a collection of network items that include context and connection information for discovered devices on the network and return this collection to MUI 1611, which draws screen elements based on the collection of network items.

The difference in information returned from FD 1601 and LLTD 1607 may be described as follows: In the case of mini-map, no LLTD process may be running and all nodes in the mini-map are built directly from Network Item Factory 1608 with FD 1601 information. The expanded full view may require LLTD 1607 to provide connection line information. Additionally, the status between nodes, including the status from local computer to a default gateway and from the default gateway to the Internet, may be obtained from another protocol, NCSI, which may be managed by FD or independent of FD as a separate component managed by Network Item Factory.

The invention claimed is:

1. A computing apparatus, comprising:
   a display unit that is capable of generating video images;
   an input device;
   a processing apparatus operatively coupled to said display unit and said input device, said processing apparatus comprising a processor and a memory operatively coupled to said processor; and
   a network interface connected to a network and to the processing apparatus; said processing apparatus being programmed to:
   retrieve current state and association information for a plurality of network devices using a plurality of discovery protocols;
   retrieve cached state and association information for a plurality of network devices; determine a difference between the current state and association information and the cached state and association information; and
   build a topology map based on the determined difference, wherein the topology map comprises:
      a representation of the computing apparatus and of each of the plurality of network devices with corresponding association information in a left, middle, and right column topology format, wherein terminal device representations are disposed in the left column, intermediate connection device representations are disposed in the middle column, and external network representations are disposed in the right column; and
   wherein the association information corresponds to at least one connection between two network devices, the two network devices comprising a parent device and a child device, the child device comprising the one of the two devices further connected from the computing apparatus, and
   wherein if the child device is a terminal device and a first terminal child, a straight horizontal connection is created between the parent and the child,
   if the child device is a terminal device and not a first terminal child, a three segment connection is created between the parent and child,
   if the child device is a non-terminal device and a first non-terminal child, a straight vertical connection is created between the parent and the child, and
   if the child device is a non-terminal device and the child device is not a first non-terminal child, a three segment connection is created between the parent and the child.

2. The apparatus of claim 1, wherein determining a difference comprises one of determining a set of devices of the current state and association information not existing in a listing of nodes of the cached state and association information, and indicating the set of devices in the topology map as added, and determining a set of devices of the cached state and association information not existing in a listing of nodes of the current state and association information, and indicating the set of devices in the topology map as removed.

3. The apparatus of claim 1, wherein the processing apparatus is further programmed to cache the difference upon building the topology map.

4. A computer memory device having stored thereon a set of machine readable instructions executable on a processor of a personal computer device, the instructions comprising:
   first instructions executable to cause the processor to detect network devices using a plurality of discovery protocols;
   second instructions executable to display a listing of a plurality of network devices detected using the plurality of discovery protocols, the listing including device state information and association information for each of the detect devices;
   third instructions executable to cause a display device to display a representation of the personal computer device and of each of the listed network devices with corresponding interconnection information in a left, middle, and right column topology format, wherein terminal device representations are disposed in the left column, intermediate connection device representations are disposed in the middle column, and external network representations are disposed in the right column; and
   wherein the interconnection information corresponds to at least one connection between two network devices, the two network devices comprising a parent device and a child device, the child device comprising the one of the two devices further connected from the computer device, and
   wherein if the child device is a terminal device and a first terminal child, a straight horizontal connection is created between the parent and the child,
   if the child device is a terminal device and not a first terminal child, a three segment connection is created between the parent and child, if the child device is a non-terminal device and a first non-terminal child, a straight vertical connection is created between the parent and the child, and if the child device is a non-terminal device and the child device is not a first non-terminal child, a three segment connection is created between the parent and the child.

5. The computer memory device of claim 4, wherein the third instructions cause the display to display the representation of the personal computer device as the top most representation of the left column.

6. The computer memory device of claim 4, wherein each of the intermediate connection device representations represents a switch, a router, a gateway, or a hub.

7. The computer memory device of claim 4, wherein at least one of the external network representations represents the Internet.

8. The computer memory device of claim 4, wherein network device state information includes accessibility and error information, and wherein association information includes connection information.

9. The computer memory device of claim 4, further comprising instructions executable to cause the three column topology to collapse into a mini-map topology comprising a user-computer representation in the left column, a connection device representation in the middle column, and the Internet in the third column.

10. The computer memory device of claim 4, wherein the third instructions include instructions operable to cause the display device to represent a portion of the listing of detected network devices based on a network profile.

11. The computer memory device of claim 10, wherein the network profile is based on a network connection of the personal computer device and a user identity.

12. The computer memory device of claim 4, wherein the plurality of device protocols comprises at least one of SSDP, UPnP, WS-Discovery, NetBIOS, Master Browser, and WINS.

* * * * *